United States Patent [19]

Heuckroth

[11] 4,114,771

[45] Sep. 19, 1978

[54] BULK WIRE STORAGE AND TRANSPORT SYSTEM

[76] Inventor: Carl C. Heuckroth, 101 Hemlock Dr., Lodi, Ohio 44254

[21] Appl. No.: 806,413

[22] Filed: Jun. 14, 1977

[51] Int. Cl.² .................................................. B62B 1/06
[52] U.S. Cl. ...................................... 214/384; 214/377
[58] Field of Search ............... 214/DIG. 34, 370, 371, 214/372, 374, 375, 384; 294/12, 17, 82 R

[56] References Cited

U.S. PATENT DOCUMENTS

| 1,866,887 | 7/1932 | Gleason et al. ...................... 214/375 |
| 2,160,556 | 5/1939 | Miller .................................... 214/375 |
| 2,417,644 | 3/1947 | Graham ................................ 214/384 |
| 2,418,522 | 4/1947 | Needham ......................... 214/DIG. 3 |
| 2,622,851 | 12/1952 | Minor .................................... 214/384 |
| 3,376,986 | 4/1968 | Farber .................................... 214/372 |
| 3,674,164 | 7/1972 | Kaufman .............................. 214/384 |

FOREIGN PATENT DOCUMENTS 1,199,598  4/1902  France ..................................... 214/370

Primary Examiner—Lawrence J. Oresky
Attorney, Agent, or Firm—Reising, Ethington, Barnard, Perry & Brooks

[57] ABSTRACT

A wire storage and moving system comprising a vertically elongated wire containing spool adapted to be lifted and transportably supported upon a manually movable wheeled device.

2 Claims, 5 Drawing Figures

BULK WIRE STORAGE AND TRANSPORT SYSTEM

The present invention relates to a welding wire storage and moving system which is particularly useful in applications where large quantities of welding wire are used as, for example, on an automotive assembly line, and where resupply of welding wire in large quantities has heretofore been difficult. It is a particular purpose of the subject invention to provide such a system where several hundred pounds of welding wire may be mounted upon a single spool in such a manner that the wire containing spool can be easily and manually transported by an individual particularly in an environment where power moving devices such as forklift trucks are not practically usable.

With the present system, it is possible to mount 500 or more pounds of welding wire on a single spool in such a manner that a simple hand-operated device may be connected to the spool to facilitate movement of the latter to an appropriate location close to a welding gun operator.

PRIOR ART SYSTEMS

One of the most difficult environments in which to operate welding guns is in conjunction with an assembly line system such as found in automotive assembly plants. The problem in such an environment is the general congestion created by various equipment serving the assembly line and which makes the movement and storage of welding wire difficult and inconvenient. As a consequence of this problem, it is current practice to suspend small spools containing welding wire overhead above the welding gun operator. Since such spools must be mounted or removed by hand, they are usually quite small and most normally do not weigh over 35 pounds including the welding wire which is the practical limit an attendant can conveniently handle by hand where power lifting devices are not feasible. Since such spools contain relatively small quantities of wire, often they must be manually changed twice during an 8-hour shift.

A further alternative has been to use large welding wire storage reels located remotely from the assembly line and feed the welding wire to the operator. However, heretofore type large welding wire storage spools or reels have been of such a construction as to require their being moved or transported by power devices such as forklift trucks which limits their application only to those environments in which a forklift truck can operate. It is obvious that most assembly line operations have so much ancillary equipment located proximate thereto that it is virtually impossible to operate forklift trucks or other power lifting devices in the vicinity where welding operations are being performed. Accordingly, most welding wire installations used on assembly lines utilize the aforementioned lightweight reels supported overhead relative to the welding gun operators.

BACKGROUND OF THE PRESENT INVENTION

The primary objectives of the subject system are first to provide a welding wire storage spool having sufficient wire carrying capacity as to require far less frequent changing or resupply and yet which spool is of such a configuration as may be transported even in a congested area by a simple manual handoperated device.

Heretofore it has been assumed in dealing with bulk quantities of welding wire that proper feed or pay-off of the wire from the spool required the same to be mounted on a spool which was relatively flat, i.e., the height or width of the reel was either substantially less than the spool's diameter or, at most, wherein the spool height was generally equal to the spool diameter.

With the subject system, an upright type spool is utilized, i.e., the spool sits on one of its ends and the welding wire coil is in a vertical or upright position. The spool is of the "dead pay" type wherein the spool remains stationary and, as an example, the wire is uncoiled through an orbit arm of the type shown in U.S. Pat. No. 3,648,947 Shelton.

It is an important aspect of the subject system that the spool diameter is substantially less than its overall height. In other words, the wire wrapped spool presents a configuration wherein the height of the spool is substantially greater than its diameter with the result that the center of gravity of the coiled spool is much closer to the outside diameter of the coiled spool than has been used in the past.

The hand-operable device which is part of applicant's system is a two wheeled cart which may be disconnectably coupled to the elongated spool containing several hundred pounds of welding wire such that the spool may be cradled against the cart for stable movement. The cart includes an upright beam so proportioned relative to the center of gravity of the wire-wrapped spool that the spool may be manually lifted and transported by an operator. As will be apparent from the detailed description which follows, the elongated nature of both the spool and cart enable them to be jointly moved through areas of minimal clearances where a flat spool and a forklift truck could not traverse.

With applicant's manually movable spooled wire storage and transport system it is now possible to provide a source of welding wire proximate a welding station whereby a single spool may supply 10 to 20 times the quantity of wire heretofore available on previous hand transportable spools. In other words, applicant has developed a unique combination of spool and transporting device which maximizes the quantity of wire which may be stored on a spool and yet be manually movable through highly congested factory areas. In realizing this combination, applicant has achieved significant manufacturing economies by greatly extending the time between wire spool changes as compared with previous type manually transportable wire supply systems.

For illustrative purposes, applicant's system is shown and described in the environment of an assembly line because of its particular applicability thereto.

Figure 1:
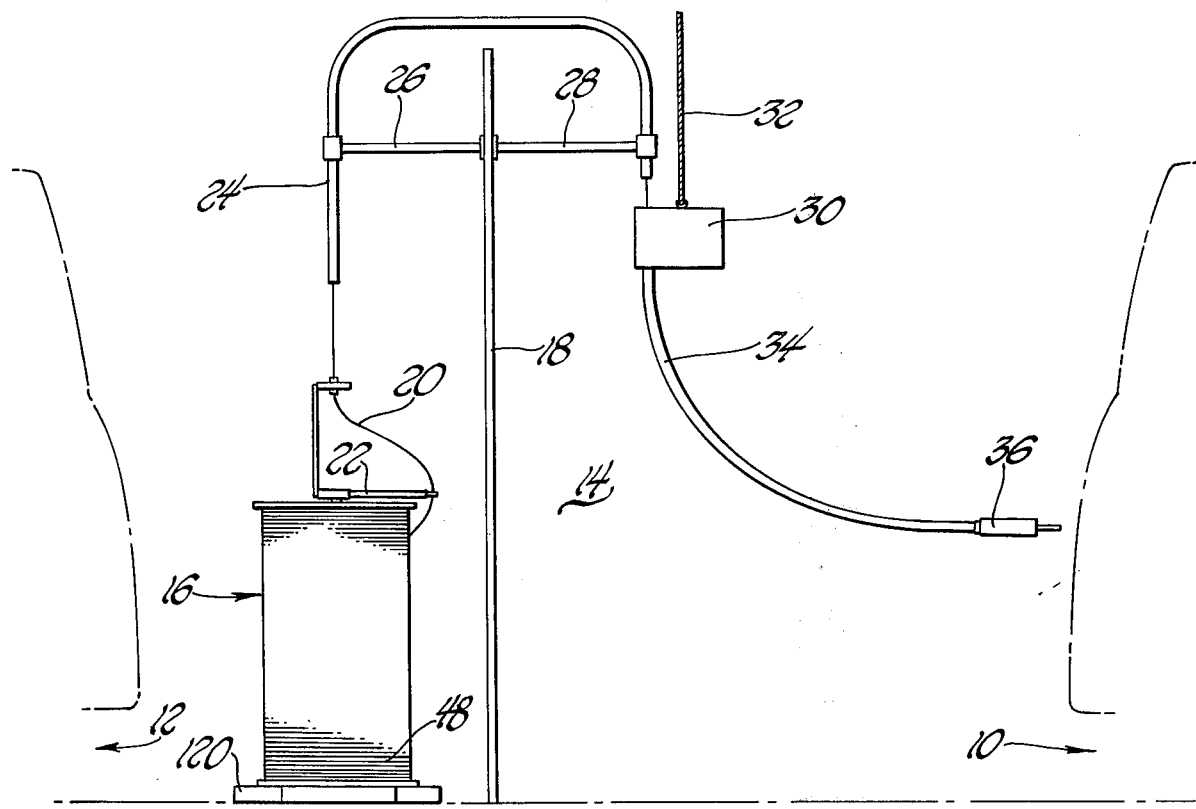
FIG. 1 illustrates the welding wire spool of the subject invention in an assembly line environment.

Reference is made to FIG. 1 of the drawings which is a diagrammatic representation of a typical factory environment in which the wire storage and moving system of the subject invention may be utilized. FIG. 1 depicts an automotive assembly line wherein conveyor lines 10 and 12 are disposed next to each other in close proximity and between which conveyor lines various types of assembly equipment such as welding stations are fitted in. One such welding station is indicated generally at 14 in FIG. 1 and includes a welding wire storage spool 16 of the type used in the present invention and is typically disposed on one side of a protective partition 18. It is common that the distance between partition 18 and conveyor line 10 can be as little as 6 to 8 feet. At the same time, it is normal that several of such welding stations are located side by side in certain areas along the length of the assembly line thus making access by forklift trucks essentially impossible. The welding wire 20 from spool 16 is fed through an unreeling orbit arm 22 of the type shown in the aforementioned Shelton patent from whence it passes through a suitable rigid conduit means 24, supported upon partition 18 by suitable brackets 26 and 28, which guides the wire upwardly and over the partition to a suitable wire drive mechanism 30 suspended from an overhead structure through a cable or chain 32. A flexible conduit 34 leads from welding wire drive device 30 to feed the wire 20 to a welding gun 36 which is manually held by a welding gun operator.

As previously noted, prior to applicant's invention it has been common industry practice to mount a small welding wire containing spool either directly upon or closely adjacent to the welding wire feed device 30. Since such small spools with wire normally weigh not more than 35 pounds, it is often necessary to change the spools twice during the course of a normal eight-hour shift. With applicant's unique wire storage and moving system, it is now possible to supply a welding gun station from a spool containing up to 500 or more pounds of wire which obviously lasts 10 to 20 times longer than the previously used, hand-mounted, small spools. The key to this improvement resides in the development of a unique spool shape in combination with a compact device for transporting such spool throughout a congested factory environment.

Figure 2:
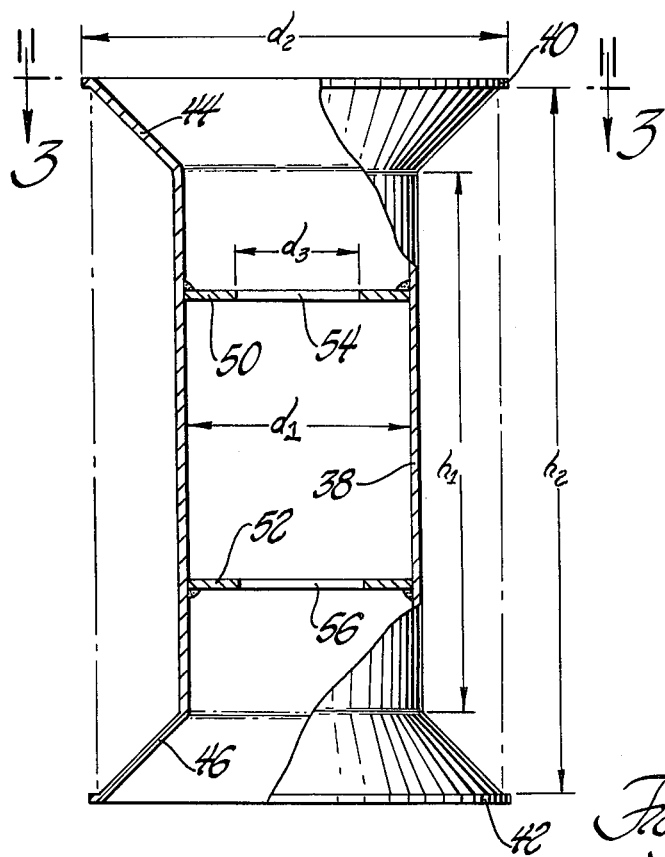
FIG. 2 is a partially sectioned elevational view of the spool utilized with applicant's system.
Figure 3:
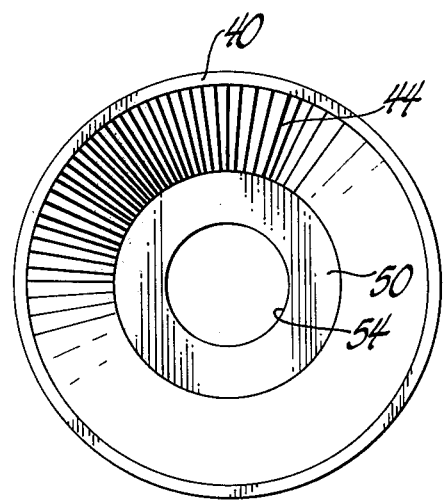
FIG. 3 is an end view of the spool taken along line 3—3 of FIG. 2.

Reference is now made to FIGS. 2 and 3 of the drawings wherein is shown the welding wire storage spool used with the present invention. Spool 16 includes a hollow cylindrical portion 38 which terminates in a pair of axially spaced, outwardly extending flange portions 40 and 42. If desired, spool 16 may be formed in such a way as to provide intermediate flared portions 44 and 46 between the ends of cylindrical portion 38 and flanges 40 and 42. A multi-layered coil of welding wire 48, as shown in FIG. 1, is adapted to be wrapped about and stored on the cylindrical portion 38 of spool 16 and contained between flanges 40 and 42. As indicated in FIG. 3, the height of cylindrical spool portion 38 is indicated by the letter $h_1$ while the diameter of the cylindrical section is indicated by the letter $d_1$. Where it has been tried in the past to use spools for storing several hundred pounds of welding wire, it has been the practice to utilize spools wherein the diameter $d_1$ of the spool has been equal to or, more normally, greater than the height $h_1$. Heretofore, it has been the practice to utilize welding wire spools such that the spool diameter $d_1$, as a minimum, was at least equal to the height $h_1$ of the spool in order to permit proper feeding of the wire to the welding wire gun. It is apparent that as the dimension $d_1$ increases relative to the height $h_1$, the center of gravity of the spool and wire coiled thereon is at an increased distance from the outer surface of the wire coiled upon the spool. Thus, as the dimension $d_1$ increases relative to the dimension $h_1$, the moment arm through which the center of gravity acts makes it ever more difficult to manually transport spools containing several hundred pounds of wire. As a consequence, where spools of such previous designs have been used containing several hundred pounds of wire, it has been necessary to transport the same around a factory on a power actuated vehicle such as a forklift truck.

Since applicant's objective is to design a wire storage and moving system which will enable spools containing up to 500 pounds or more of wire to be manually moved by a single operator through congested factory areas, he first developed an elongated spool construction wherein the height $h_1$ of the spool was approximately two times the diameter $d_1$. In this way, applicant reduced the moment arm through which the center of gravity of the wire filled spool would be acting.

To further decrease the effective moment arm through which the center of gravity of wire containing spool acts, a pair of radially inwardly extending flanges 50 and 52 are formed on the internal diameter of cylindrical spool portion 38. As will subsequently become apparent, the innermost portion of either of the flanges 50 or 52 is the point from which spool 16 is lifted and transported. The diameters of flange openings 54 and 56 are preferably approximately one-half diameter $d_1$. It is possible to utilize a single centered internal flange rather than the two flanges 50 and 52.

Figure 4:
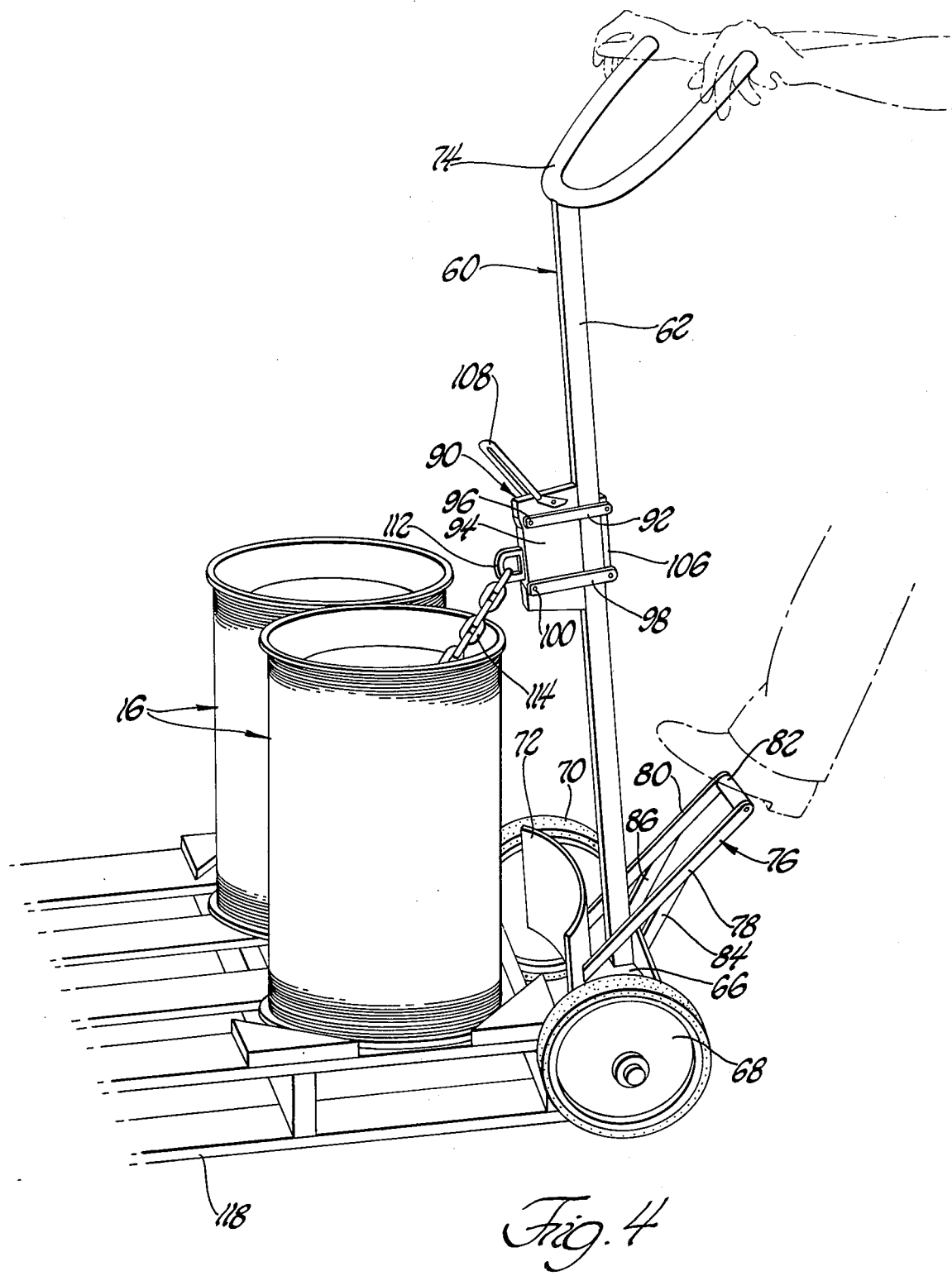
FIG. 4 shows the manually operable cart about to load and lift a welding wire spool from a transport skid.
Figure 5:
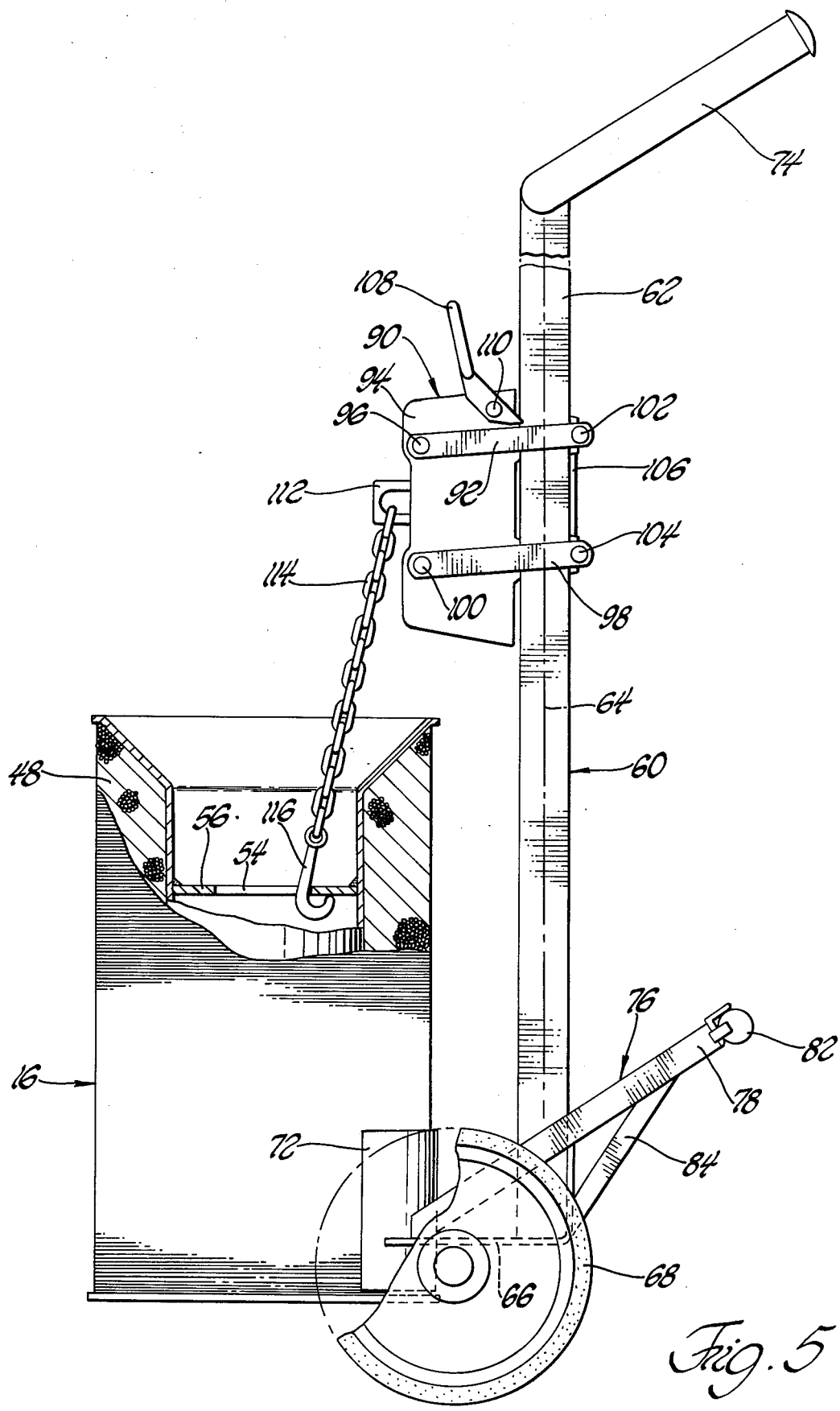
FIG. 5 shows applicant's system wherein the welding wire spool is supported for transport upon the manually operable cart.

Referring to the letters indicated in FIG. 2, the following are typical dimensions of a spool capable of carrying 500 pounds of copper flashed steel welding wire:

$h_1 = 18$ inches
$h_2 = 24$ inches
$d_1 = 8$ inches
$d_2 = 14$ inches
$d_3 = 4$ inches Reference is now made to FIGS. 4 and 5 of the drawings and which particularly show device 60 which may be disconnectably coupled with spool 16 to manually transport the latter.

As seen in FIGS. 4 and 5, wheel device 60 includes an elongated upright beam element 62 having a longitudinal axis 64. A transverse beam element 66 is fixed to the lower end of upright beam 62. A pair of wheel members 68 and 70 are coaxially mounted on the respective ends of transverse beam 66.

An arcuate cradle member 72 is fixed to transverse beam 66 and is disposed between wheel members 68 and 70. Arcuate cradle 72 is in the form of a section of a cylinder of generally the same radius of curvature as cylindrical section 38 of spool 16. The arcuate plane of cradle element 72 is so disposed on transverse beam 66 as to be substantially parallel with the longitudinal axis 64 of upright beam 62.

A generally U-shape handlebar member 74 is fixed to the upper end of upright beam 62 and extends upwardly and rearwardly from the side of said upright beam opposite to that on which the arcuate cradle 72 is disposed.

A rigid arm 76 is also fixed to transverse beam 66 and is supported as a cantilever therefrom. Arm 76 is a U-shaped member comprising legs 78 and 80 which are secured to transverse beam 66 such that the legs straddle the upright beam element 62. The free end of arm 76 includes a transverse portion 82 which is adapted to be engaged by an operator's foot. Arm 76 also includes a pair of bracing legs 84 and 86 extending between legs 78 and 80 and transverse beam 66 to rigidify the arm. Rigid arm 76 extends rearwardly and upwardly in the same direction as handlebar element 74 and is generally parallel thereto.

A slide element 90 is adjustably mounted on beam element 62 through a parallelogram type linkage arrangement comprising a pair of upper levers 92 pivotally connected to element body 94 upon cross pin 96. A pair of lower levers 98 are similarly connected to body 94 through cross pin 100. Cross pins 102 and 104 connect the other ends of levers 92 and 98 to a common link 106 disposed proximate upright beam 62 on the opposite side thereof from element body 94.

The weight of element body 92 normally causes a counterclockwise rotation of levers 92 and 94 about pins 102 and 104, as viewed in FIG. 5, so as to clamp the slide element 90 against upright beam 62. To release the slide element 90 for adjustment along beam 62, a lever 108 is pivotally mounted upon body 94 through pin 110 for clockwise rotation whereby the lever imparts a clockwise rotation of levers 92 and 98 about cross pins 96 and 100 to unclamp body 94 relative to beam 62 thereby permitting vertical adjustment along the beam.

Slide element 90 also includes an anchor member 112 to which one end of a flexible or articulated element such as a chain 114 is secured. The other end of chain element 114 is free-hanging with respect to slide member 90 and terminates at its free end with a hook element 116.

As seen in FIG. 4, a plurality of wire containing spools 16 are mounted on a skid 118 which may be transported about the factory to a convenient location. When it is desired to transport or move the wire containing spool 16 to the immediate vicinity of a welding station such as 14, wheel device 60 is moved to a position closely proximate the spool. When so positioned, slide member 90 is adjusted on beam 62 so as to be spaced vertically above the uppermost flange of the spool and locked in such position. In this position, the free-handing end of chain 114 is dropped within the cylindrical portion 38 of spool 16 such that chain hook 116 is interlocked with the radial flange 50 interiorly of the spool. If necessary, slide member 90 is further adjusted upwardly to eliminate any slack in the chain element 114. Next, the operator places one foot against the arm 76 while at the same time grasping handlebar 74 with both hands to impart a rearward rotation to upright beam 62 about the axis of wheels 68 and 70. This movement imparts a lifting movement to the wire containing spool 16 bringing the same into nesting engagement with cradle 72 while holding the same off of the ground. The wheel device and spool may now be easily moved to the appropriate location adjacent the welding gun operator and positioned on a suitable platform 120 as shown in FIG. 1. Spool supporting platform 120 is approximately three or four inches high and facilitates the safe landing or unloading of the wire containing spool. Without such a platform, i.e., landing the spool directly on the floor, during the demounting of the wire containing spool from wheel device 60, upright beam 62 would tend to go over-center thereby causing the lower end of the device to kick rearwardly toward the operator and possibly causing injury.

When nested against cradle 72, as seen in FIG. 5, the longitudinal or upright axis of spool 16 is generally parallel to axis 64 of upright beam 62.

It is apparent that the elongated spool 16, combined with the compact wheel device 60, results in a wire storage and movement system requiring little more clearance than is required for the spool itself, thus enabling the spool to be transported in a congested environment.

It is apparent that other modifications of the invention are possible within the intended scope of the hereinafter appended claims.

What is claimed is:

1. A wire storage and moving system comprising a spool, said spool including a normally upright hollow cylindrical portion with open ends, said cylindrical portion having a height substantially greater than its diameter, said cylindrical portion including frusto-conical flange portions formed at the respective ends thereof and upon either of which flanges said spool is adapted to be supported in an upright manner, a multi-layered coil of wire wrapped about said cylindrical spool portion and confined between said spool flange portions, a radially inwardly projecting annular flange formed internally of said hollow cylindrical portion and axially inwardly spaced from said flange portions; and a wheeled device adapted to disconnectably coact with said spool, said device including a generally upright beam element, a transverse beam fixed to the lower end of said upright beam element, a pair of spaced wheel members coaxially mounted at the ends of said transverse beam, a handlebar element secured to the upper end of said upright beam and extending rearwardly and upwardly thereof, an arcuate cradle fixed to said transverse beam intermediate said wheel members and projecting forwardly of the transverse beam, a slide member supported upon said upright beam for movement along the length thereof, said slide member including a locking element for adjustably fixing the position of said slide member along the length of said upright beam so as to be positioned vertically above the uppermost of said spool flanges; an elongate connector element fixed at one end to said slide element and including another end freehanging relative to said slide member, a hook element connected to the free end of the connector element, said wheel device being movable to a position in which said arcuate cradle is disposed circumferentially proximate the lower portion of said multi-layered coil of wire, the free end of said elongate element being adapted to extend within the hollow portion of said spool to enable the hook element to connectably engage with said annular flange, a foot engaging bracket element projecting from said transverse beam and extending rearwardly and upwardly thereof whereby forces may be applied to the foot engaging bracket element and the handlebar element to rotate said upright beam about the wheel axis causing the elongate connector element to lift the spool into nesting engagement with the arcuate cradle, the elongated configuration of said spool in conjunction with the lifting action of said elongate connector and hook elements internally of said spool facilitating engagement and movement of the spool into a transport position on said wheeled device in a stable manner.

2. A wire storage and moving system as set forth in claim 1 wherein the height of the hollow cylindrical portion of said spool is at least two times its diameter and the internal diameter of the annular flange is approximately one-half the diameter of said cylindrical portion diameter.

* * * * *

UNITED STATES PATENT AND TRADEMARK OFFICE
CERTIFICATE OF CORRECTION

PATENT NO. : 4,114,771
DATED : September 19, 1978
INVENTOR(S) : Carl C. Heuckroth It is certified that error appears in the above-identified patent and that said Letters Patent are hereby corrected as shown below:

Column 5, line 16, "92" should read --- 94 ---.

Column 5, line 17, "94" should read --- 98 ---.

Column 5, line 42, "free-handing" should read --- free hanging ---.

Signed and Sealed this

Twenty-seventh Day of February 1979

[SEAL]

Attest:

RUTH C. MASON
Attesting Officer

DONALD W. BANNER
Commissioner of Patents and Trademarks